United States Patent
Kobayashi et al.

(10) Patent No.: US 9,755,517 B2
(45) Date of Patent: Sep. 5, 2017

(54) MULTI-THRESHOLD PANIC COMPARATORS FOR MULTI-PHASE BUCK CONVERTER PHASE SHEDDING CONTROL

(71) Applicant: Dialog Semiconductor (UK) Limited, London (GB)

(72) Inventors: Hidenori Kobayashi, Kanagawa (JP); Hyungtaek Chang, Gilbert, AZ (US)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 14/970,870

(22) Filed: Dec. 16, 2015

(65) Prior Publication Data
US 2017/0179822 A1  Jun. 22, 2017

(51) Int. Cl.
*H02M 3/158* (2006.01)

(52) U.S. Cl.
CPC .................................. *H02M 3/158* (2013.01)

(58) Field of Classification Search
None
See application file for complete search history.

(56) References Cited

U.S. PATENT DOCUMENTS

| | | | |
|---|---|---|---|
| 7,570,036 B2 | 8/2009 | Tang et al. | |
| 7,919,955 B2 * | 4/2011 | Tang | H02M 3/1584 323/272 |
| 7,982,441 B2 | 7/2011 | Crowther et al. | |
| 8,618,788 B2 | 12/2013 | Trivedi et al. | |
| 8,710,810 B1 | 4/2014 | McJimsey et al. | |
| 8,829,872 B1 | 9/2014 | Pierson et al. | |

(Continued)

FOREIGN PATENT DOCUMENTS

DE   102013114620   9/2014

OTHER PUBLICATIONS

"A 6A 40MHz Four-Phase ZDS Hysteretic DC-DC Converter with 118mV Droop and 230ns Response Time for a 5A/5ns Load Transient," by Min Kyu Song et al., ISSCC 2014 / Session 4 / DC-DC Converters / 4.2, 2014 IEEE International Solid-State Circuits Conference, Feb. 9-13, 2014, pp. 80-82.

(Continued)

*Primary Examiner* — Jeffrey Gblende
(74) *Attorney, Agent, or Firm* — Saile Ackerman LLC; Stephen B. Ackerman; Billy Knowles

(57) ABSTRACT

A control circuit included within a multi-phase switched-mode converter is configured for adjusting operational signals for adding power stages of the multi-phase switched-mode converter to dynamically respond to transient changes in load current for minimizing undershoot while avoiding overshoot of an output voltage of the multi-phase switched-mode converter. The control circuit has panic comparators configured such that each panic comparator has an input terminal connected to receive the output voltage for comparison with one of a plurality of reference voltages. A panic controller receives panic indicator signals from the panic comparators and determines which of the power stages are to be activated to match the transient change to the load current to prevent for minimizing undershoot and for preventing overshoot of the output voltage of the multi-phase switched-mode converter. The multi-phase switched-mode converter may operate in a continuous or discontinuous conduction mode.

10 Claims, 12 Drawing Sheets

(56) References Cited

U.S. PATENT DOCUMENTS

| | | | |
|---|---|---|---|
| 8,907,642 B1 | 12/2014 | Burstein et al. | |
| 9,201,434 B2 | 12/2015 | Dally | |
| 2004/0145845 A1* | 7/2004 | Schuellein | H02M 3/1584 361/93.1 |
| 2004/0227495 A1* | 11/2004 | Egan | G05F 1/618 323/272 |
| 2009/0152949 A1* | 6/2009 | Adragna | H02J 1/102 307/31 |
| 2009/0261795 A1 | 10/2009 | Tang et al. | |
| 2010/0109622 A1 | 5/2010 | Miki et al. | |
| 2010/0320983 A1* | 12/2010 | Wu | H02M 3/1584 323/283 |
| 2013/0342176 A1* | 12/2013 | Yang | H02M 3/1584 323/234 |
| 2014/0062433 A1 | 3/2014 | Zhou et al. | |
| 2014/0300331 A1 | 10/2014 | Trimeloni et al. | |

OTHER PUBLICATIONS

"An Optimal Control Method for Photovoltaic Grid-Tied-Interleaved Flyback Microinverters to Achieve High Efficiency in Wide Load Range," by Zhiliang Zhang et al., IEEE Transactions on Power Electronics, vol. 28, No. 11, Nov. 2013, pp. 5074-5087.

"Design Considerations of Auto Phase Number Control in Multiphase Voltage Regulators," by Chun Cheung et al., Applied Power Electronics Conference and Exposition (APEC), 2012, Feb. 5-9, 2012, pp. 1253-1257.

"Efficiency improvement in multiphase converter by changing dynamically the number of phases," by P. Zumel et al., Power Electronics Specialists Conference, 2006. PESC '06. 37, Jun. 18-22, 2006, pp. 1-6.

"FPGA implementation of Phase Sheddingwith Time-Optimal Controller in Multi-phase buck converters," by A. Costabeber et al., Industrial Electronics 2009. IECON '09. 35th Annual Conference of IEEE, Nov. 3-5, 2009, pp. 2919-2924.

"Multiphase ZVS Active Clamp Boost Converter: DC and Dynamic Current Sharing," by Esther De Jodar et al., IEEE Transactions on Industrial Electronics, vol. 60, No. 11, Nov. 2013, pp. 4947-4959.

German Search Report, Application No. 10 2016 200 389.5, Applicant: Dialog Semiconductor Inc., Mail date: Jun. 22, 2016, 5 pgs., and English Translation, 3 pgs.

\* cited by examiner

MULTI-THRESHOLD PANIC COMPARATORS FOR MULTI-PHASE BUCK CONVERTER PHASE SHEDDING CONTROL

TECHNICAL FIELD

This disclosure relates generally to switched-mode power converters. More particularly, this disclosure relates to multiple phase switched-mode power converters. Even more particularly, this disclosure relates to multiple phase switched-mode power converters with circuits for instantaneously activating the deactivated phases of the multiple phase switched-mode power converters.

BACKGROUND

As is known in the art, switched-mode power supplies incorporate a switching regulator to convert electrical power efficiently. The switched-mode power supplies transfer power from a source to a load while converting voltage and current applied to the input of the circuit to an output voltage and current suitable for the load. The switched-mode power supplies consist of a power stage and a control circuit. The power stage performs the basic power conversion from the input voltage to the output voltage and includes switches and an output filter. The control stage receives necessary feedback signals from the power stage and control signals from system operating functions. The feedback and control signals are interpreted to provide the driving signals for the power stage.

In current hand-held mobile electronic devices such as cellular telephones, tablet computers, portable media players and the like require a higher dynamic range of output current from the switched-mode power supplies. What is needed is that as the range of output currents requirements expands, the switched-mode power supplies must operate more efficiently over a broad range of output currents.

Multi-phase switched-mode power supplies include a quantity of switched-mode converters that are coupled in parallel to deliver high output currents to a load. The multiple parallel switched-mode converters provide an energy efficient DC/DC converter for supplying high output currents. Switching loss and DC loss degrades the efficiency of a switched-mode converter. The DC loss is due to the voltage drop across resistances such as on-resistance of the switching devices in the power stage and it is proportional to the square of the load current. Contribution to the efficiency is proportional to the load current and dominant for higher load current. To improve the efficiency for higher load current, activating multiple phases in parallel reduces the effective on-resistance. However, switching loss of the switching devices in the power stage is almost constant regardless of the load current. For lower load current, the switching loss contribution becomes dominant, as the DC loss is essentially negligible. At the lower load currents, the number of active phases should be minimized for reducing the switching loss and improving the efficiency. To improve the efficiency, some of multi-phase switched-mode power supplies have a phase shedding function. The number of phase are deactivated or activated according to the output current to maximize the efficiency.

SUMMARY

An object of this disclosure is to provide circuits and methods for adjusting operational signals for adding at least one of a plurality of slave power stages of a multi-phase switched-mode converter to dynamically respond to transient changes in load current for minimizing undershoot while avoiding overshoot of an output voltage of the multi-phase switched-mode converter.

To accomplish at least this object, a control circuit included within the multi-phase switched-mode converter has a plurality of panic comparators. Each panic comparator has an input terminal connected to receive an output voltage of the multi-phase switched-mode converter. The control circuit has a plurality of panic reference voltage sources, wherein each panic reference voltage source is connected to a reference terminal of one panic comparator to provide a panic reference voltage to the one panic comparator. Each panic comparator is configured to compare the output voltage of the multi-phase switched-mode converter to one of the reference voltages from one of the panic reference voltage sources to generate a panic indicator signal at an output terminal of the one panic comparator. A panic controller is connected to each of the output terminals of the plurality of panic comparators to receive panic indicator signals from the plurality of panic comparators signifying that the output voltage of the multi-phase switched-mode converter is less than the panic reference voltage of at least one of the plurality panic reference voltage sources. The panic controller determines which of the slave power stages are to be activated to match the transient change to the load current for minimizing undershoot and for preventing overshoot of the output voltage of the multi-phase switched-mode converter. The panic reference voltage level of the plurality of panic reference voltage sources are separated by increments of voltage such that the panic controller will activate at least one of the slave power stages for minimizing undershoot and for preventing the overshoot.

Each of the plurality of panic reference voltage sources is adjustable to vary the panic reference voltage levels dependent upon a transient response of each of the plurality of slave power stages.

In various embodiments, the control circuit has a pulse frequency modulation controller that is configured to provide discontinuous conduction mode control signals to the master power stage for operating in a discontinuous conduction mode. The pulse frequency controller has a pulse frequency modulation comparator connected to receive the output voltage of the multi-phase switched-mode converter and configured to provide discontinuous control signal to the pulse frequency modulation controller. The pulse frequency controller has a pulse frequency modulation reference voltage source. The pulse frequency modulation reference voltage source provides a pulse frequency modulation reference voltage to the pulse frequency modulation comparator for controlling the discontinuous conduction mode of the multi-phase switched-mode converter. When the output voltage level is less than a voltage level of the pulse frequency modulation reference voltage and greater than the panic voltage levels of plurality of panic reference voltage sources, the multi-phase switched-mode converter operates in the discontinuous conduction mode.

When a large transient change in the load current occurs, the pulse frequency modulation controller activates the master power stage to operate in the continuous conduction mode and when the large transient becomes larger than the panic reference voltage level of at least one of the plurality panic reference voltage sources, the panic controller activates at least one of the slave power stages for minimizing undershoot and for preventing the overshoot of the voltage level of the output voltage.

In other embodiments that accomplish at least this object, a multi-phase switched-mode converter is configured for adding at least one of a plurality of slave power stages included within the multi-phase switched-mode converter to dynamically respond to transient changes in load current while avoiding overshoot of an output voltage of the multi-phase switched-mode converter. The multi-phase switched-mode converter includes at least the master power stage and one slave power stage. The multi-phase switched-mode converter includes a control circuit configured for adjusting operational signals of a master power stage included within the multi-phase switched-mode converter and the plurality of slave power stages of the multi-phase switched-mode converter. The control circuit has a plurality of panic reference voltage sources, wherein each panic reference voltage source is connected to a reference terminal of one panic comparator to provide a panic reference voltage to the one panic comparator. Each panic comparator is configured to compare the output voltage of the multi-phase switched-mode converter to one of the panic reference voltages from one of the panic reference voltage sources to generate a panic indicator signal at an output terminal of the one panic comparator. A panic controller is connected to each of the output terminals of the plurality of panic comparators to receive panic indicator signals from the plurality of panic comparators signifying that the output voltage of the multi-phase switched-mode converter is less than the panic reference voltage of at least one of the plurality panic reference voltage sources. The panic controller determines which of the slave power stages are to be activated to match the transient change to the load current for minimizing undershoot and for preventing overshoot of the output voltage of the multi-phase switched-mode converter. The panic reference voltage level of the plurality of panic reference voltage sources are separated by increments of voltage such that the panic controller will activate at least one of the slave power stages for minimizing undershoot and for preventing the overshoot.

Each of the plurality of panic reference voltage sources is adjustable to vary the panic reference voltage levels dependent upon a transient response of each of the plurality of slave power stages.

In various embodiments, the control circuit has a pulse frequency modulation controller that is configured to provide discontinuous conduction mode control signals to the master power stage for operating in a discontinuous conduction mode. The pulse frequency controller has a pulse frequency modulation comparator connected to receive the output voltage of the multi-phase switched-mode converter and configured to provide discontinuous control signal to the pulse frequency modulation controller. The pulse frequency controller has a pulse frequency modulation reference voltage source. The pulse frequency modulation reference voltage source provides a pulse frequency modulation reference voltage to the pulse frequency modulation comparator for controlling the discontinuous conduction mode of the multi-phase switched-mode converter. When the output voltage level is less than a voltage level of the pulse frequency modulation reference voltage and greater than the voltage levels of plurality of reference voltage sources, the multi-phase switched-mode converter operates in the discontinuous modulation mode.

When a large transient change in the load current occurs, the pulse frequency modulation controller activates the master power stage to operate in the continuous conduction mode and when the large transient becomes larger than the panic reference voltage level of at least one of the plurality panic reference voltage sources, the panic controller activates at least one of the slave power stages for minimizing undershoot and for preventing the overshoot of the voltage level of the output voltage.

In other embodiments that accomplishes at least this object, a method for operating a multi-phase switched-mode converter is structured for adding at least one of a plurality of slave power stages included within the multi-phase switched-mode converter to dynamically respond to transient changes in load current while avoiding overshoot and minimizing undershoot voltage changes. The method consists of steps for adjusting operational signals of a master power stage included within the multi-phase switched-mode converter and the plurality of slave power stages. The first step of adjusting the operational signals is providing at least one panic reference voltage source for generating at least one panic reference voltage level. The output voltage of the multi-phase switched-mode converter is compared with at least panic reference voltage level and at least one panic indicator signal signifying that the output voltage level of the multi-phase switched-mode converter is less than at least one panic reference voltage level is generated. Which of the slave power stages that are to be activated is determined so as to match the precipitous load current increase for minimizing undershoot and for preventing overshoot of the output voltage of the multi-phase switched-mode converter.

The method separates the plurality of panic reference voltage levels by incremental voltage levels such that at least one of the slave power stages is activated for minimizing the undershoot and for preventing the overshoot. The multi-phase switched-mode converter has at least two slave power stages for best operation of the method. The method further includes varying each of the plurality of panic reference voltage levels dependent upon a transient response of each of the plurality of slave power stages.

In various embodiments, the step of adjusting operational signals of the master power stage and the at least one slave power stage further provides a discontinuous conduction mode control signal to the master power stage for operating in a discontinuous conduction mode. A pulse frequency modulation reference voltage is compared with the received the output voltage level of the multi-phase switched-mode converter. When output voltage level is less than the pulse frequency modulation reference voltage level and greater than the plurality of panic reference voltage levels, the discontinuous conduction mode control signal is generated to be provided to the master power stage.

The step of adjusting operational signals of the master power stage and the plurality of slave power stages of the multi-phase switched-mode converter further includes the step of activating the master power stage to operate in the continuous conduction mode, when a large transient change in load current occurs. At least one of the slave power stages is activated for minimizing undershoot and for preventing the overshoot of the voltage level of the output voltage, when the large transient becomes larger than the panic reference voltage levels of at least one of the plurality panic reference voltage levels.

In other embodiments that accomplish at least this object, an apparatus is configured to include means for performing the steps of the method for operating a multi-phase switched-mode converter.

BRIEF DESCRIPTION OF THE DRAWINGS

FIG. 1a is a schematic of a multi-phase switched-mode power supply incorporating a panic comparator of the related art known to the inventors of this disclosure.

FIG. 1b is a schematic of the phase power stages of the multi-phase switched-mode power supply FIG. 1a.

DETAILED DESCRIPTION

When a load current increases precipitously, the deactivated phases must be activated instantaneously to achieve a good load transient response (less output voltage disturbance) to support higher output load current. One solution for having the good load transient response implementing a so-called 'panic' comparator. The panic comparator detects a drop in the output voltage of the multi-phase switched-mode power supply as an under-voltage condition. The multi-phase switched-mode power supply instantly and asynchronously activates all the switched-mode converter phases. In this case, output voltage drop can be minimized.

This method may cause 'over-shoot' in a situation where the load transient is not too precipitous, but still triggers the panic comparator. With a moderate load transient, all the switched-mode converter phases are instantly activated, and a high current flows into the output capacitor. This current may be more than required and cause excess output voltage overshoot to occur.

One solution to this problem is lowering the panic reference voltage to avoid the overshoot at lower output current levels. This causes the panic comparator to function less effective at heavy load condition and result in more undershoot at heavy load transient conditions.

Figures 1A, 1B:
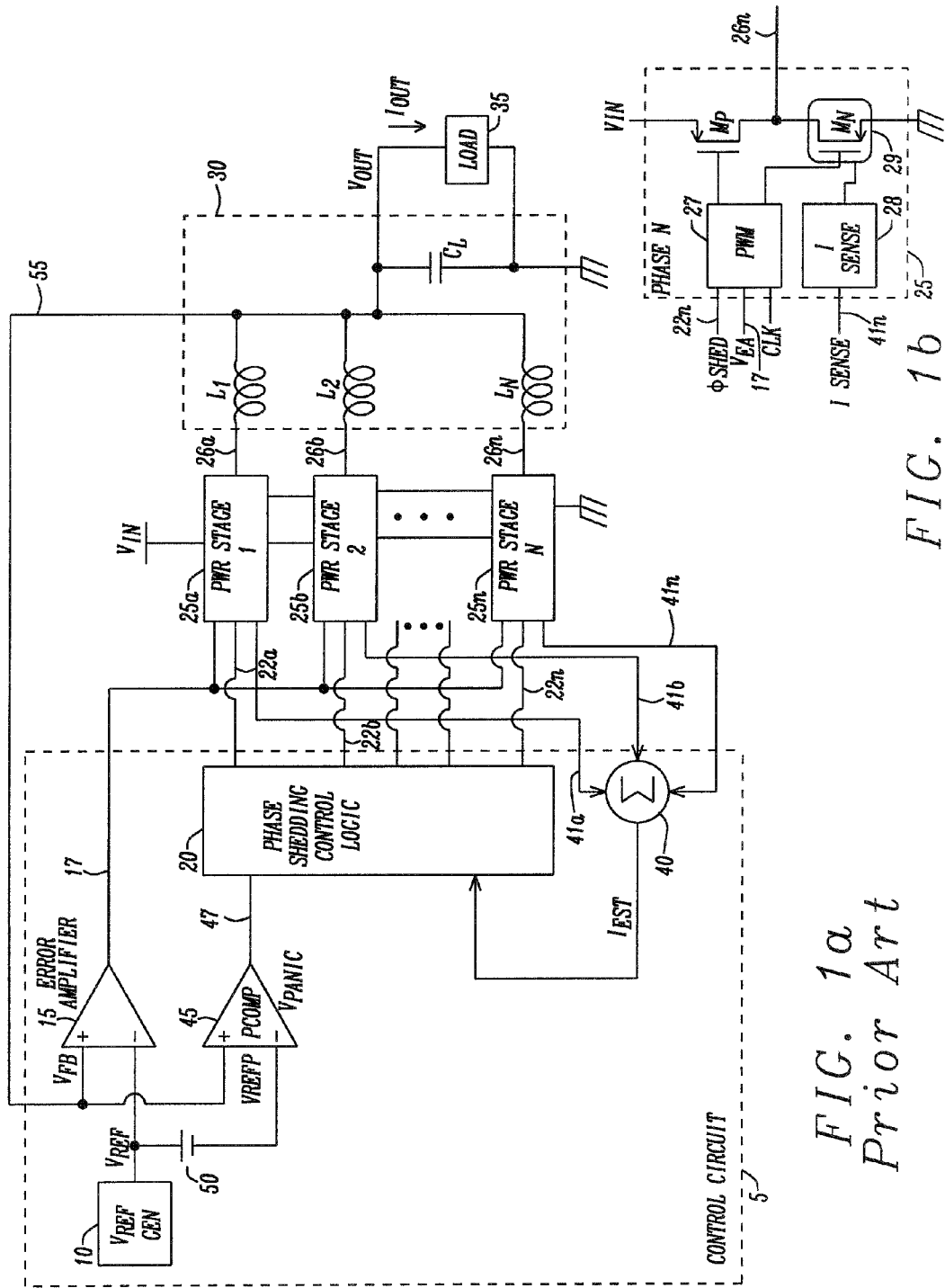

FIG. 1a is a schematic of a multi-phase switched-mode power supply incorporating a panic comparator that is related to the art as known to the inventors of this disclosure. The switched-mode converter is structured as a multiphase buck switched-mode converter. The multiphase buck switched-mode converter has a control circuit 5, multiple power stages 25a, 25b, . . . , 25n, and a filter stage 30. The multiple power stages 25a, 25b, . . . , 25n include one master power stage 25a and multiple slave power stages 25b, . . . , 25n. One power stage 25a of the multiple power stages 25a, 25b, . . . , 25n is designated as a master power stage with the remaining power stages 25b, . . . , 25n being designated as slave power stages.

The filter stage 30 has a multiple inductors $L_1, L_2, \ldots, L_n$ where a first terminal of each of the inductors $L_1, L_2, \ldots, L_n$ is connected to an output 26a, 26b, . . . , 26n of one of the power stages 25a, 25b, . . . , 25n. The second terminals of the inductors $L_1, L_2, \ldots, L_n$ are commonly connected together and to the first plate of a load capacitor $C_L$. The second plate of the load capacitor $C_L$ is connected to the ground reference voltage source. The commonly connected second terminals of the inductors $L_1, L_2, \ldots, L_n$ and the first plate of the load capacitor $C_L$ are connected to the load 35. The load current $I_{OUT}$ is the current flowing to the load 35. The load current $I_{OUT}$ is the total current from all the power stages 25a, 25b, . . . , 25n.

FIG. 1b is a schematic of each of the phase power stages 25a, 25b, . . . , 25n of the multi-phase switched-mode power supply FIG. 1a. Each of the power stages 25a, 25b, . . . , 25n includes a pulse width modulator 27 that receives the error voltage 17. The outputs of the pulse width modulator 27 are applied to the gates of a PMOS transistor $M_P$ and an NMOS transistor $M_N$. The source of the PMOS transistor $M_P$ is connected to the input supply voltage source VIN and the source of the NMOS transistor $M_N$ is connected to the ground reference voltage source. The commonly connected drains of the PMOS transistor $M_P$ and the NMOS transistor $M_N$ are connected to the output terminal 26a, 26b, . . . , 26n of each of the power stages 25a, 25b, . . . , 25n that is connected to one of the input terminals of the filter section 30 that is a first terminal of each of inductors $L_1, L_2, \ldots, L_n$.

The NMOS transistor $M_N$ has a current sensor 29 connected such that the current flowing in the current sensor 29 is detected. The current sensor 29 is connected to a current sense circuit 28 that conditions the detected current flowing in the NMOS transistor $M_N$ for transfer as the current sense signal 41n.

Returning to FIG. 1a, the commonly connected second terminals of the inductors $L_1, L_2, \ldots, L_n$ and the first plate of the load capacitor $C_L$ are connected to an input of the control circuit 5 to provide a feedback path 55 for comparing the output voltage $V_{OUT}$ of the multiphase buck switched-mode converter with a reference voltage level $V_{REF}$. The reference voltage generator 10 generates the reference voltage level $V_{REF}$.

The control circuit 5 has an error amplifier 15 that receives the fed-back output voltage $V_{OUT}$ and the reference voltage level $V_{REF}$ from reference voltage generator 10. The output of the error amplifier 15 is an error voltage 17 that is applied to each of the power stages 26a, 26b, . . . , 26n.

The current sense signals 41a, . . . , 41n from each of the power stages 25a, 25b, . . . , 25n are inputs to the total current estimation circuit 40. The total current estimation circuit 40 is a summation circuit that totals the current sense signals 41a, . . . , 41n to determine the estimated total current signal $I_{EST}$. The estimated total current signal $I_{EST}$ is applied to the phase shedding control circuit 20. As the estimated total current signal $I_{EST}$, the phase shedding control circuit 20 generates the phase shedding signals 22a, 22b, . . . , 22n for activating and deactivating selected power stages 25a, 25b, . . . , 25n for maintaining the efficiency of the operation of the multi-phase switched-mode power supply.

The control circuit 5 has a panic comparator 45 that compares the fed-back output voltage $V_{FB}$ to a panic reference voltage $V_{REFP}$. The voltage source 50 generates the panic reference voltage $V_{REFP}$ a being a voltage level less than the reference voltage level $V_{REF}$ as generated by the reference voltage generator 10. The result of the comparison of the fed-back output voltage $V_{FB}$ and the panic reference voltage $V_{REFP}$ is the panic signal $V_{PANIC}$ that is the output 47 of the panic comparator 45. The panic signal $V_{PANIC}$ is an input to the phase shedding control circuit 20 for activating all deactivated power stages 25a, 25b, . . . , 25n simultaneously.

Figure 2:
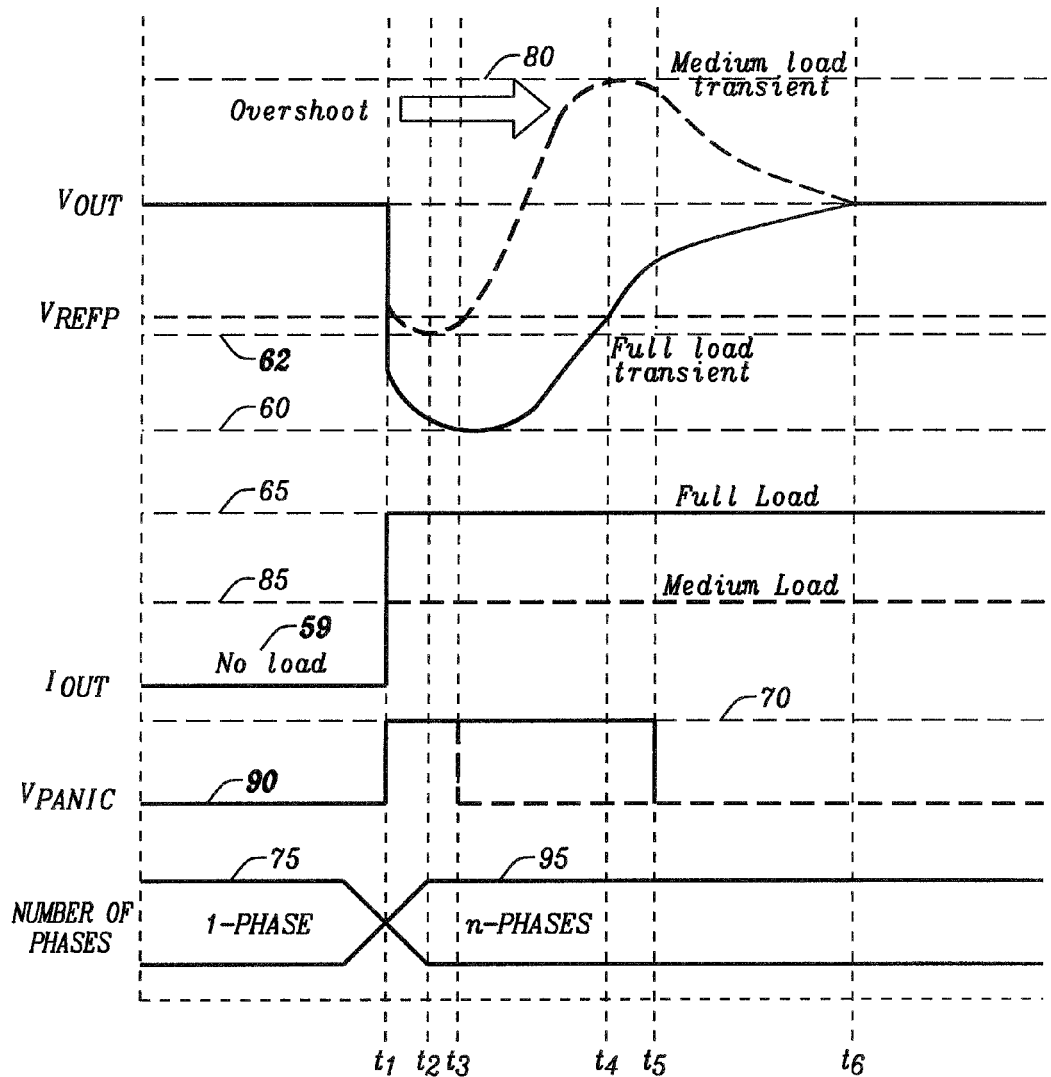
FIG. 2 is a plot illustrating the voltage and current waveforms within the multi-phase switched-mode power supply of FIGS. 1a and 1b.

FIG. 2 is a plot illustrating the voltage and current waveforms within the multi-phase switched-mode power supply of FIGS. 1a and 1b. Prior to the time $t_1$, the output voltage $V_{OUT}$ with the output current $I_{OUT}$ at a no load current level 59 with only one power stage 25a being activated 75. At the time $t_1$, the output load 35 requires that the output current $I_{OUT}$ transit to a full load current level 65. The output voltage $V_{OUT}$ drops to a voltage level 60 less than the panic reference voltage $V_{REFP}$ and the panic signal $V_{PANIC}$ is activated from the low level 90 to the high level 70 to instruct the phase shedding control circuit 20 to activate all deactivated power stages 25a, 25b, . . . , 25n simultaneously. At the time $t_2$, all the power stages 25a, 25b, . . . , 25n are activated 95 such that the output voltage $V_{OUT}$ begins to rise until it is greater than the panic reference voltage $V_{REFP}$ at the time $t_4$. The output voltage $V_{OUT}$ returns to its steady controlled state at the time $t_6$.

At the time $t_1$, if the output load 35 requires that the output current $I_{OUT}$ transit to a moderate load current level 85, the output voltage $V_{OUT}$ drops to a level 62 that is less than the panic reference voltage $V_{REFP}$ and the panic signal $V_{PANIC}$ is again activated from the low level 90 to the high level 70 to instruct the phase shedding control circuit 20 to activate 95 all deactivated power stages 25a, 25b, . . . , 25n simultaneously. The output voltage $V_{OUT}$ has an overshoot voltage level 80 that peaks at about the time $t_4$ and decays back to its steady controlled state at the time $t_6$. The overshoot is the result of the all the power stages 25a, 25b, . . . , 25n being instantly activated. This causes a high output current $I_{OUT}$ to flow into the output capacitor $C_L$. This excess output current $I_{OUT}$ is more than required, thus causing an excess of the output voltage $V_{OUT}$ and the overshoot voltage level 80 to occur.

Figure 3A:
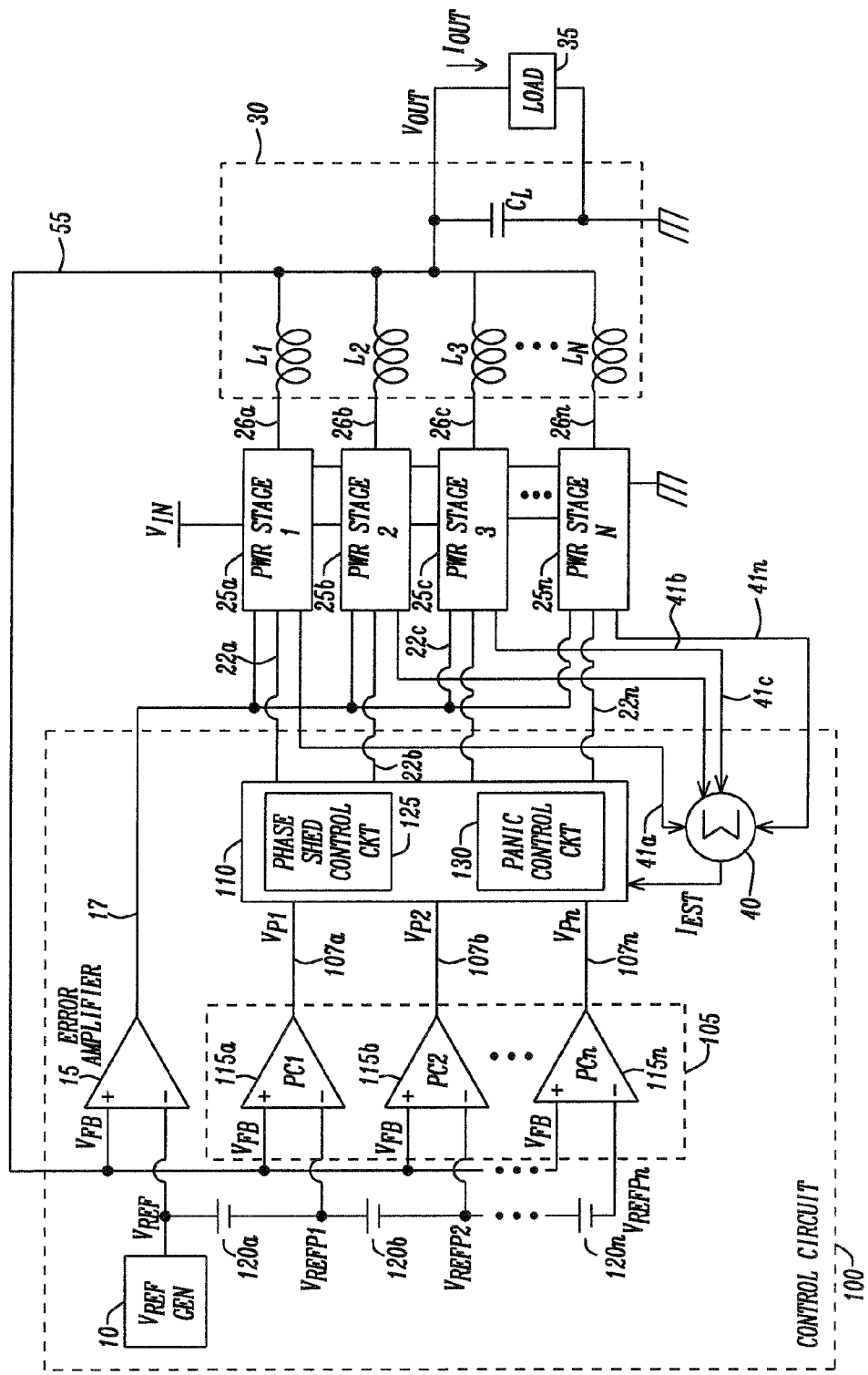
FIG. 3a is a schematic of a multi-phase switched-mode power supply incorporating a panic comparator embodying the principle of the present disclosure.

At the times $t_3$ and $t_5$, the panic signal $V_{PANIC}$ is deactivated to the low level 90 for the moderate load at the time $t_3$ and for the heavy load at the time $t_5$. Once the panic signal $V_{PANIC}$ is activated to the high level 70 at the time $t_1$, the power stages 25a, 25b, . . . , 25n are activated and the full four phase control of the power stages 25a, 25b, . . . , 25n continues regardless of the state of the panic signal $V_{PANIC}$ FIG. 3 is a schematic of a multi-phase switched-mode power supply incorporating a panic comparator embodying the principle of the present disclosure. The switched-mode converter of FIG. 3 is structured as a multiphase buck switched-mode converter. The multiphase buck switched-mode converter has a control circuit 100, multiple power stages 25a, 25b, 25c, . . . , 25n, and a filter stage 30. The multiple power stages 25a, 25b, 25c, . . . , 25n, and a filter stage 30 are structured and function as described in FIG. 1.

The commonly connected second terminals of the inductors $L_1, L_2, \ldots, L_n$ and the first plate of the load capacitor $C_L$ are connected to an input of the control circuit 100 to provide a feedback path 55 for comparing the output voltage $V_{OUT}$ of the multiphase buck switched-mode converter with a reference voltage level $V_{REF}$. The reference voltage generator 10 generates the reference voltage level $V_{REF}$.

The control circuit 100 has an error amplifier 15 that receives the fed-back output voltage $V_{FB}$ and the reference voltage level $V_{REF}$ from reference voltage generator 10. The output of the error amplifier 15 is an error voltage 17 that is applied to each of the power stages 25a, 25b, 25c, . . . , 25n.

The current sense signals 41a, . . . , 41n from each of the power stages 25a, 25b, 25c, . . . , 25n are inputs to the total current estimation circuit 40. The total current estimation circuit 40 is a summation circuit that totals the current sense signals 41a, . . . , 41n to determine the estimated total current signal $I_{EST}$. The estimated total current signal $I_{EST}$ is applied to the phase control circuit 110 and thus to the phase shedding control circuit 125. As the estimated total current signal $I_{EST}$ varies, the phase control circuit 125 generates the phase shedding signals 22a, 22b, . . . , 22n for activating and deactivating selected power stages 25a, 25b, 25c, . . . , 25n for maintaining the efficiency of the operation of the multi-phase switched-mode power supply.

The control circuit 100 has a panic comparator circuit 105 that compares the fed-back output voltage $V_{FB}$ to multiple panic reference voltages $V_{REFP1}, V_{REFP2}, \ldots, V_{REFPn}$. The panic reference voltage sources 120a, 120b, . . . , 120n generates the multiple panic reference voltages $V_{REFP1}, V_{REFP2}, \ldots, V_{REFP1}$ that are at incremental voltage levels less than the reference voltage level $V_{REF}$ as generated by the reference voltage generator 10. The panic comparator circuit 105 has multiple panic comparators 115a, 115b . . . , 115n. Each of the multiple panic comparators 115a, 115b . . . , 115n are connected to one of the incremental multiple panic reference voltages $V_{REFP1}, V_{REFP2}, \ldots, V_{REFPn}$. The result of the comparison of the fed-back output voltage $V_{FB}$ and the incremental multiple panic reference voltages $V_{REFP1}, V_{REFP2}, \ldots, V_{REFPn}$ are the multiple panic signals $V_{P1}, V_{P2}, \ldots, V_{Pn}$ that is the outputs 117a, 117b . . . , 117n of the multiple panic comparators 115a, 115b . . . , 115n. The multiple panic signals $V_{P1}, V_{P2}, \ldots, V_{Pn}$ are inputs to the phase control circuit 110 that is then transferred to the panic controller circuit 125 for activating all deactivated power stages 25a, 25b, 25c, . . . , 25n as required to dynamically respond to transient changes in load current for minimizing undershoot while avoiding overshoot of an output voltage of the multi-phase switched-mode converter.

Figure 3B:
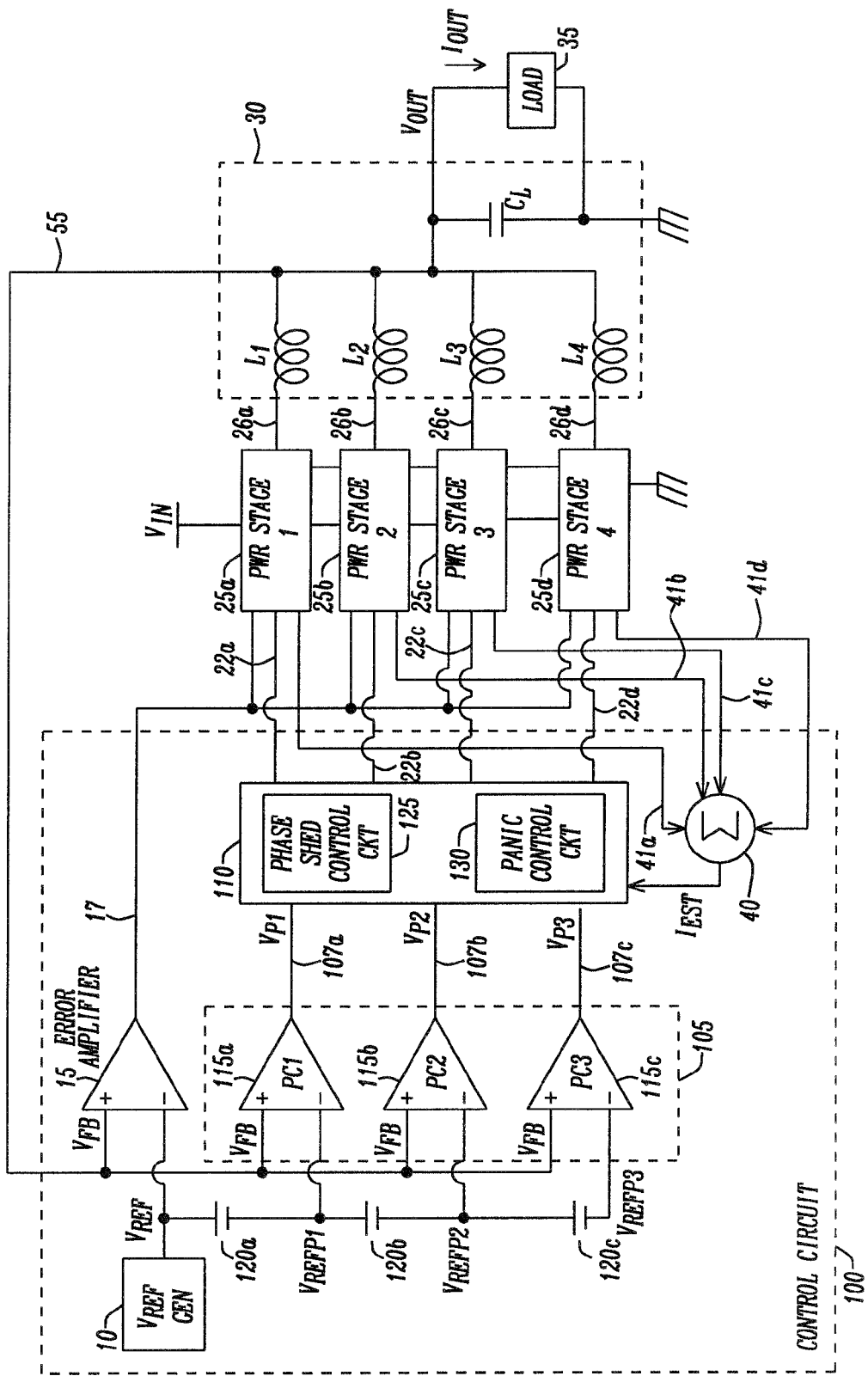
FIG. 3b is a schematic of a multi-phase switched-mode power supply incorporating a panic comparator of 3a with three panic converters and four power stages embodying the principle of the present disclosure.

FIG. 3b is a schematic of a multi-phase switched-mode power supply incorporating a panic comparator of 3a with three panic converters 115a, 115b, and 115c and four power stages 25a, 25b, 25c, and 25d embodying the principle of the present disclosure. FIGS. 4-8 are plots illustrating the voltage and current waveforms within the multi-phase switched-mode power supply of FIG. 3b under various operating conditions. In order to simplify the explanation of the operation of the multi-phase switched-mode power supply of FIG. 3a, the multi-phase switched-mode power supply has a total of four power stages 25a, 25b, 25c, 25d as shown in FIG. 3b. One power stage will be designated as the master stage and the remaining three power stages 25b, 25d will designated as the slave power stages. The multi-phase switched-mode power supply includes three panic comparators 115a, 115b, and 115c. Three panic reference voltage sources 120a, 120b, and 120c are connected to the three panic comparators 115a, 115b, 115c to provide the three panic reference voltages $V_{REFP1}, V_{REFP2}, \ldots, V_{REFPn}$ generated by the three panic reference voltage sources 120a, 120b, and 120c. The three panic reference voltages $V_{REFP1}, V_{REFP2}$, and $V_{REFP3}$ are at voltage level increments of 10 mv less than the reference voltage level $V_{REF}$ as generated by the reference voltage generator 10 in this instance the reference voltage level $V_{REF}$ is approximately 1.0V. Thus, the first panic comparator 115a has a reference voltage $V_{REFP1}$ of approximately 990 mV (−10 mV), the second panic comparator 115b has a reference voltage $V_{REFP2}$ of approximately 980 mV (−20 mV), and the third panic comparator 115c has a reference voltage $V_{REFP3}$ of approximately 970 mV (−30 mV). For this example the full load required of the four power stage 25a, 25b, 25c, and 25d operation is 40 A. As is apparent from FIG. 3a, this example does not define any restrictions of the number of power stages 25a, 25b, 25c, ..., 25n, the voltage and current capacity of the multi-phase switched-mode power supply, or the number of panic comparators 115a, 115b ..., 115n with their panic reference voltages $V_{REFP1}$, $V_{REFP2}$, ..., $V_{REFPn}$.

Figure 4:
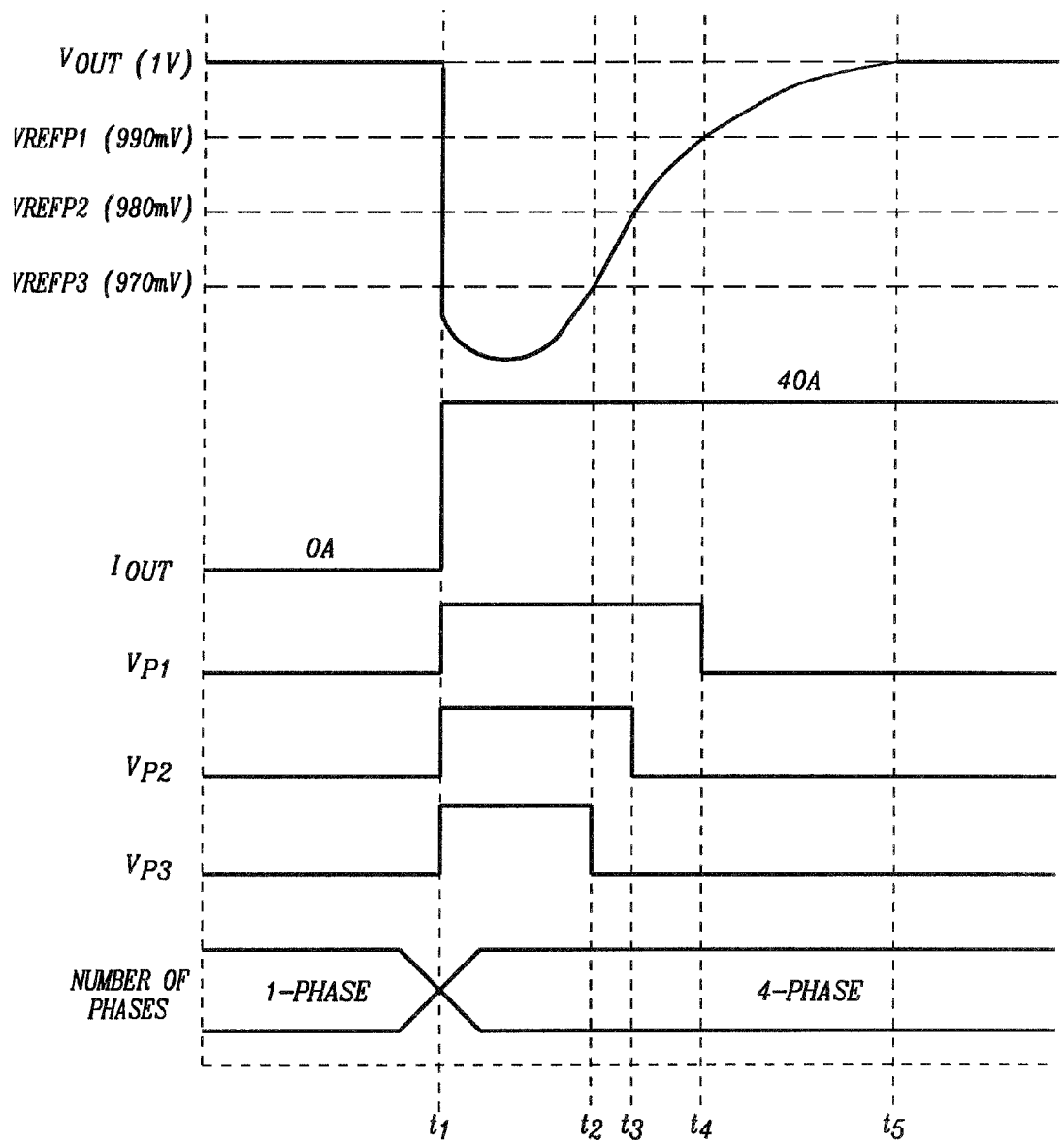
FIGS. 4-8 are plots illustrating the voltage and current waveforms within the multi-phase switched-mode power supply of FIG. 3 under various operating conditions.

Referring now to FIGS. 3b and 4, prior to the time $t_1$, the output current $I_{OUT}$ flowing through the load is approximately zero amps (0 A). The output voltage $V_{OUT}$ is to be maintained at the reference voltage level $V_{REF}$ as generated by the reference voltage generator 10. The output voltage $V_{OUT}$ and the output load current $I_{OUT}$ is maintained by the master power stage 25a and the slave power stages 25b, 25c, and 25d have been deactivated. The output panic signals $V_{P1}$, $V_{P2}$, and $V_{P3}$ of the three panic comparators 115a, 115b, and 115c are set to a deactivated logic level (0) with the master power stage 25a being the single stage activated.

At the time $t_1$, the load circuit is actuated such that the output load current $I_{OUT}$ increases to 40 A precipitously. The master power stage 25a is not able to respond with sufficient current. Thus the output current $I_{OUT}$ is drawn from the load capacitor $C_L$. This causes the output voltage $V_{OUT}$ to decrease practically instantaneously until it reaches a level less than all the panic reference voltage levels $V_{REFP1}$, $V_{REFP2}$, and $V_{REFP3}$. All of the panic comparators 115a, 115b, and 115c are activated and the panic signals $V_{P1}$, $V_{P2}$, and $V_{P3}$ transit from the deactivated level (0) to the activated level (1). The slave power stages 25b, 25c, and 25d are activated such that now the master power stage 25a and the slave power stages 25b, 25c, and 25d begin to increase the current capacity such that the output voltage $V_{OUT}$ rises toward the reference voltage level $V_{REF}$ of approximately 1.0V. At the time $t_2$, the third panic comparator 115c deactivates and the panic signal $V_{Pn}$ transits from the activated level (1) to the deactivated level (0). At the time $t_3$, the second panic comparator 115b deactivates and the panic signal $V_P2$ transits from the activated level (1) to the deactivated level (0). And at the time $t_3$, the first panic comparator 115a deactivates and the panic signal $V_{P1}$ transits from the activated level (1) to the deactivated level (0). Once the panic signals $V_{P1}$, $V_{P2}$, and $V_{P3}$ are activated at the time $t_1$, the power stages 25a, 25b, 25c, and 25d are activated and the full four phase control of the power stages 25a, 25b, 25c, and 25d continues regardless of the state of the panic signals $V_{P1}$, $V_{P2}$, and $V_{P3}$. At the time $T_5$, the four power stage 25a, 25b, 25c, and 25d are now regulating the output voltage $V_{OUT}$.

Figure 5:
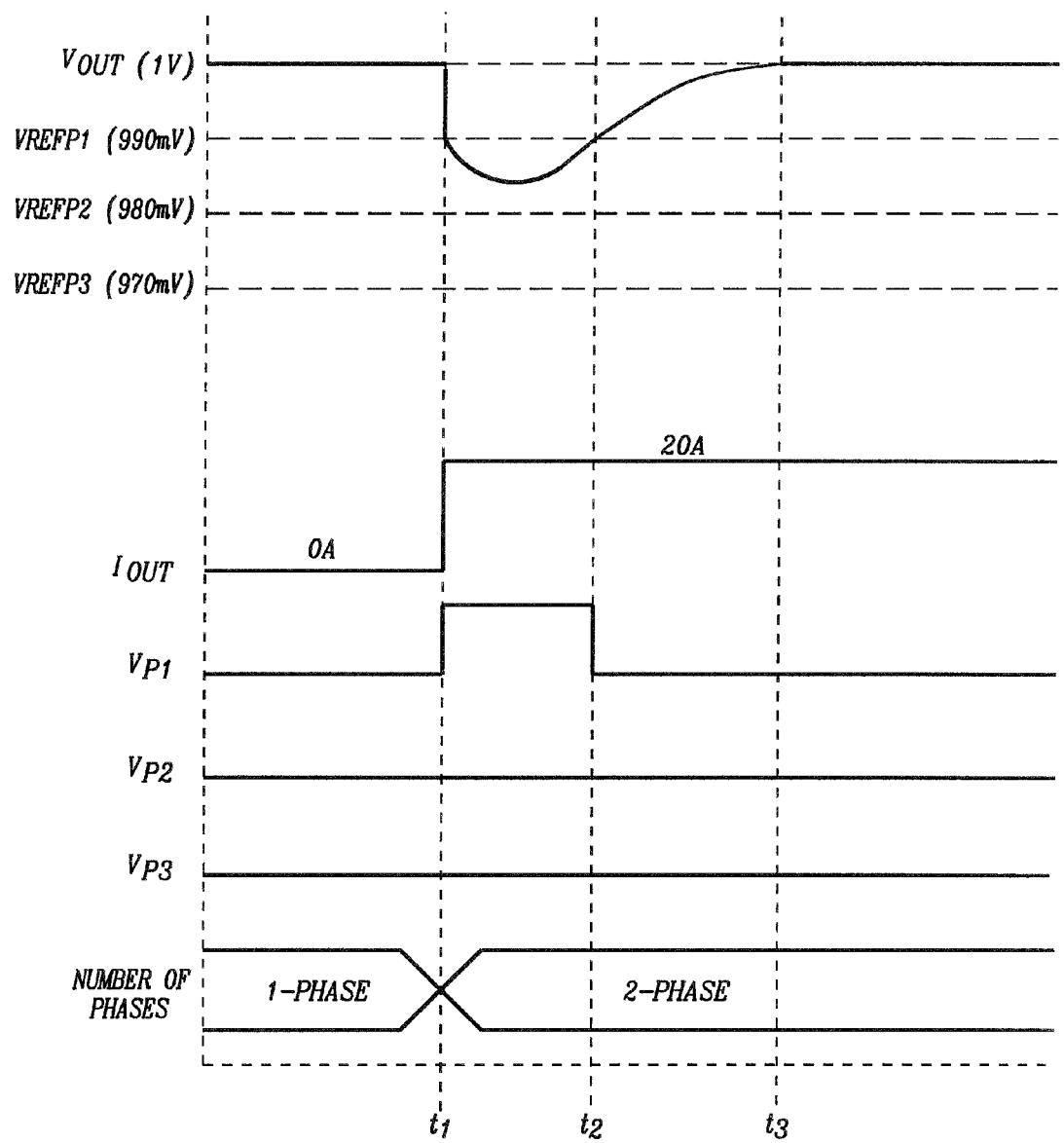

Referring now to FIGS. 3b and 5, prior to the time $t_1$, the output current $I_{OUT}$ flowing through the load is approximately zero amps (0 A). The output voltage $V_{OUT}$ is to be maintained at the reference voltage level $V_{REF}$ as generated by the reference voltage generator 10. The output voltage $V_{OUT}$ and the output load current $I_{OUT}$ are maintained by the master power stage 25a and the slave power stages 25b, 25c, and 25d have been deactivated. The output panic signals $V_{P1}$, $V_{P2}$, and $V_{P3}$ of the three panic comparators 115a, 115b and 115d are to a deactivated logic level (0) with the master power stage 25a being the single stage activated.

At the time $t_1$, the load circuit is actuated such that the output current $I_{OUT}$ increases to a moderate current level of approximately 20 A, again, precipitously. The master power stage 25a is not able to respond with sufficient current. Thus the output current $I_{OUT}$ is drawn from the load capacitor $C_L$. Thus causing the output voltage $V_{OUT}$ to decrease practically instantaneously until it reaches a level less than the first panic reference voltage level $V_{REFP1}$. The first panic comparator 115a is activated and the panic signal $V_{P1}$ transits from the deactivated level (0) to the activated level (1). The slave power stage 25b is activated such that now the master power stage 25a and the slave power stage 25b begin to increase the current capacity such that the output voltage $V_{OUT}$ rises toward the reference voltage level $V_{REF}$ of approximately 1.0V. At the time $t_2$, the first panic comparator 115a deactivates and the panic signal $V_{P1}$ transits from the activated level (1) to the deactivated level (0). As above, once the panic signal $V_{P1}$ is activated at the time $t_1$, the power stages 25a and 25b are activated and the phase control of the power stages 25a and 25b continues regardless of the state of the panic signals $V_{P1}$, $V_{P2}$, and $V_{P3}$. At the time $t_3$, the two power stage 25a and 25b are now regulating the output voltage $V_{OUT}$.

Figure 6:
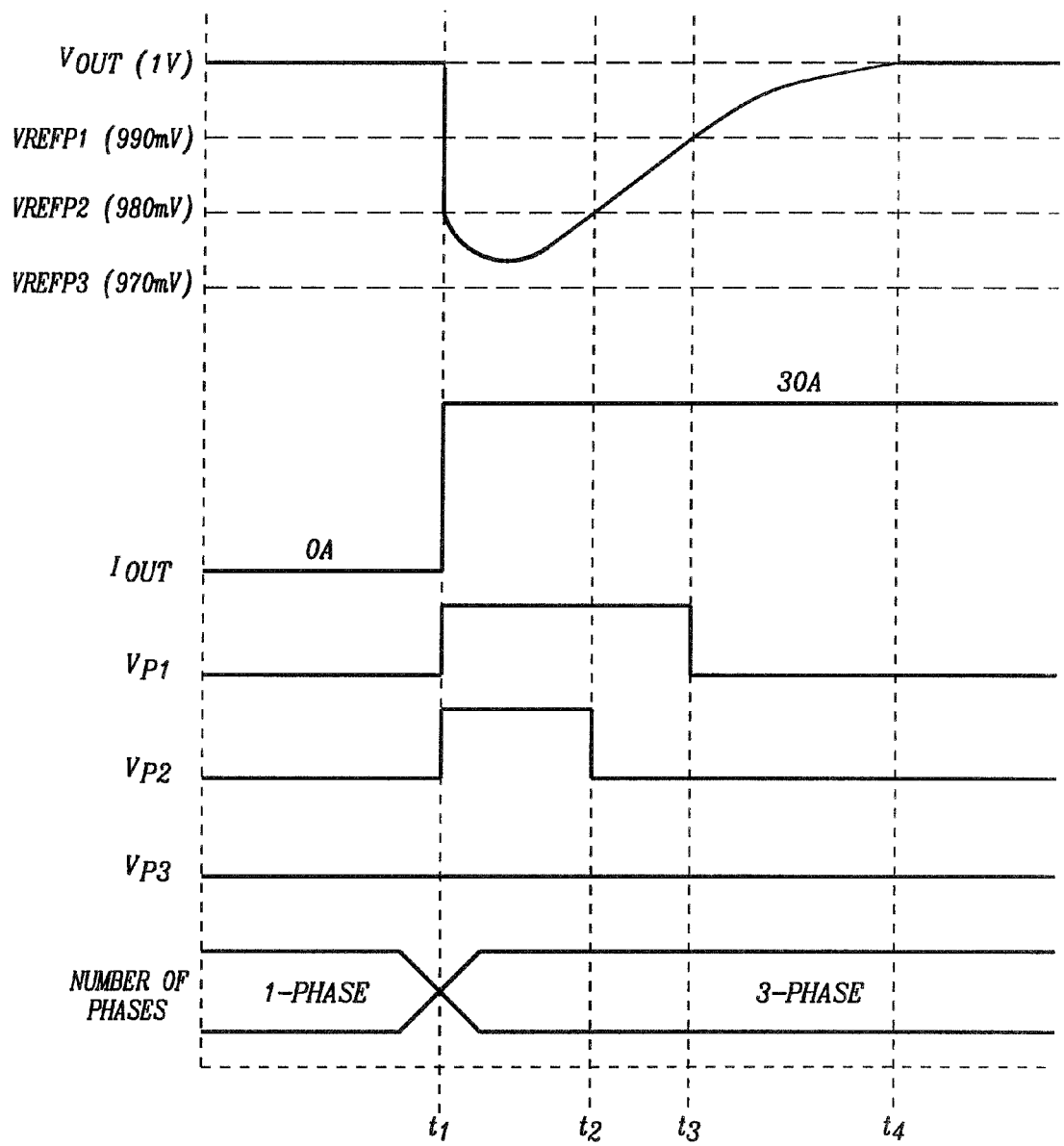

Referring now to FIGS. 3b and 6, prior to the time $t_1$, the output current $I_{OUT}$ flowing through the load is approximately zero amps (0 A). The output voltage $V_{OUT}$ is to be maintained at the reference voltage level $V_{REF}$ as generated by the reference voltage generator 10. The output voltage $V_{OUT}$ and the output current $I_{OUT}$ is maintained by the master power stage 25a and the slave power stages 25b, 25c, and 25d have been deactivated. The output panic signals $V_{P1}$, $V_{P2}$, ..., $V_{Pn}$ of the three panic comparators 115a, 115b and 115d are set to a deactivated logic level (0) with the master power stage 25a being the single stage activated.

At the time $t_1$, the load circuit is actuated such that the output load current $I_{OUT}$ increases to a higher load current level of approximately 30 A, again, precipitously. The master power stage 25a is not able to respond with sufficient current. Thus the output current $I_{OUT}$ is drawn from the load capacitor $C_L$. Thus causing the output voltage $V_{OUT}$ to decrease practically instantaneously until it reaches a level less than the second panic reference voltage level $V_{REFP2}$. The first and second panic comparator 115a and 115b are activated and the panic signals $V_{P1}$ and $V_{P2}$ transit from the deactivated level (0) to the activated level (1). The two slave power stages 25b and 25c are activated such that now the master power stage 25a and the slave power stages 25b and 25c begin to increase the current capacity such that the output voltage $V_{OUT}$ rises toward the reference voltage level $V_{REF}$ of approximately 1.0V. At the time $t_2$, the second panic comparator 115b deactivates and the panic signal $V_{P2}$ transits from the activated level (1) to the deactivated level (0). At the time $t_3$, the second panic comparator 115b deactivates and the panic signal $V_{P2}$ transits from the activated level (1) to the deactivated level (0). As above, once the panic signals $V_{P1}$ and $V_{P2}$ are activated at the time $t_1$, the power stages 25a, 25b, and 25c are activated and the full four phase control of the power stages 25a, 25b, and 25c continues regardless of the state of the panic signals $V_{P1}$, $V_{P2}$, and $V_{P3}$. At the time $t_4$, the two power stage 25a and 25b are now regulating the output voltage $V_{OUT}$.

Figure 7:
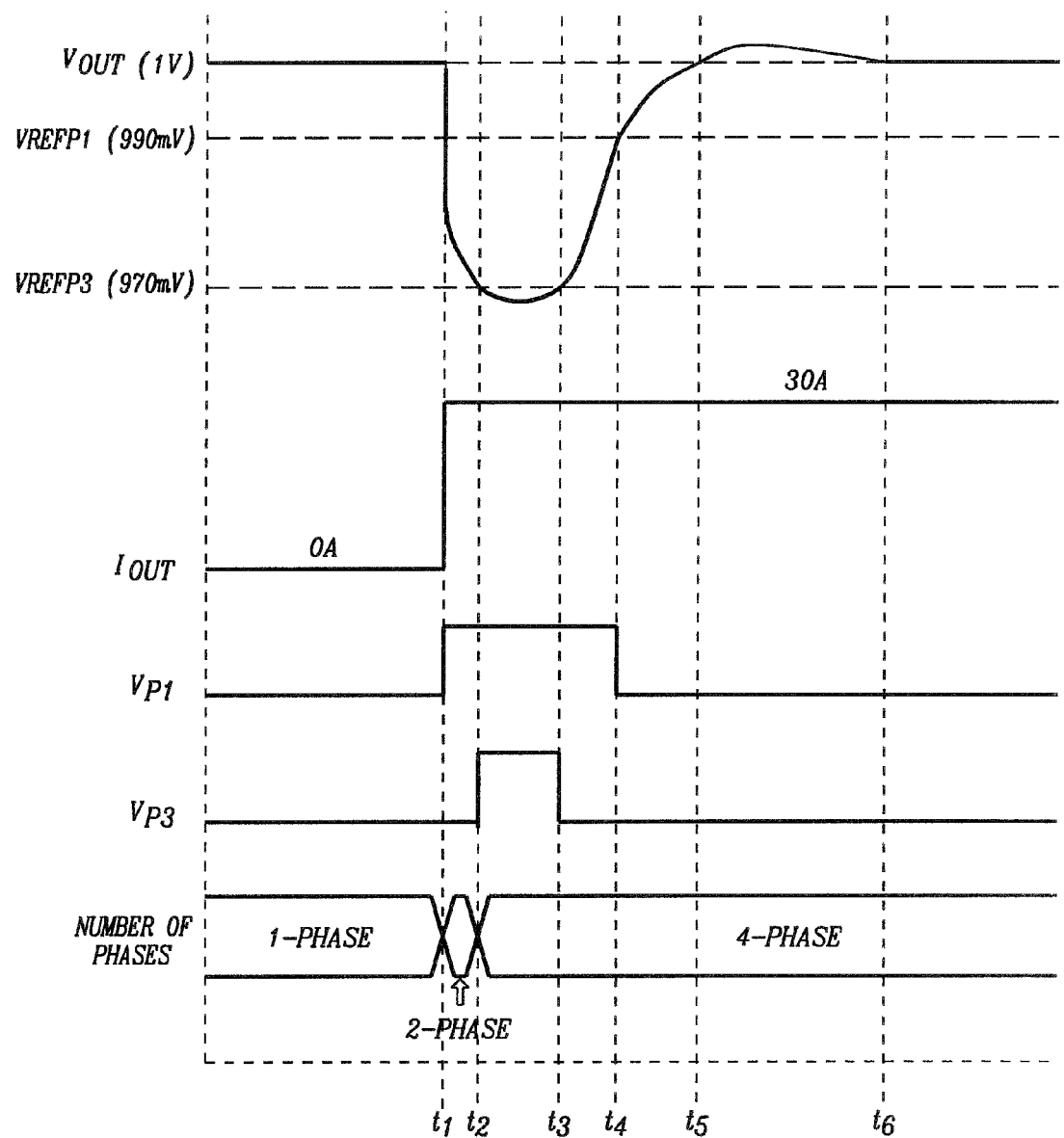
Figure 8:
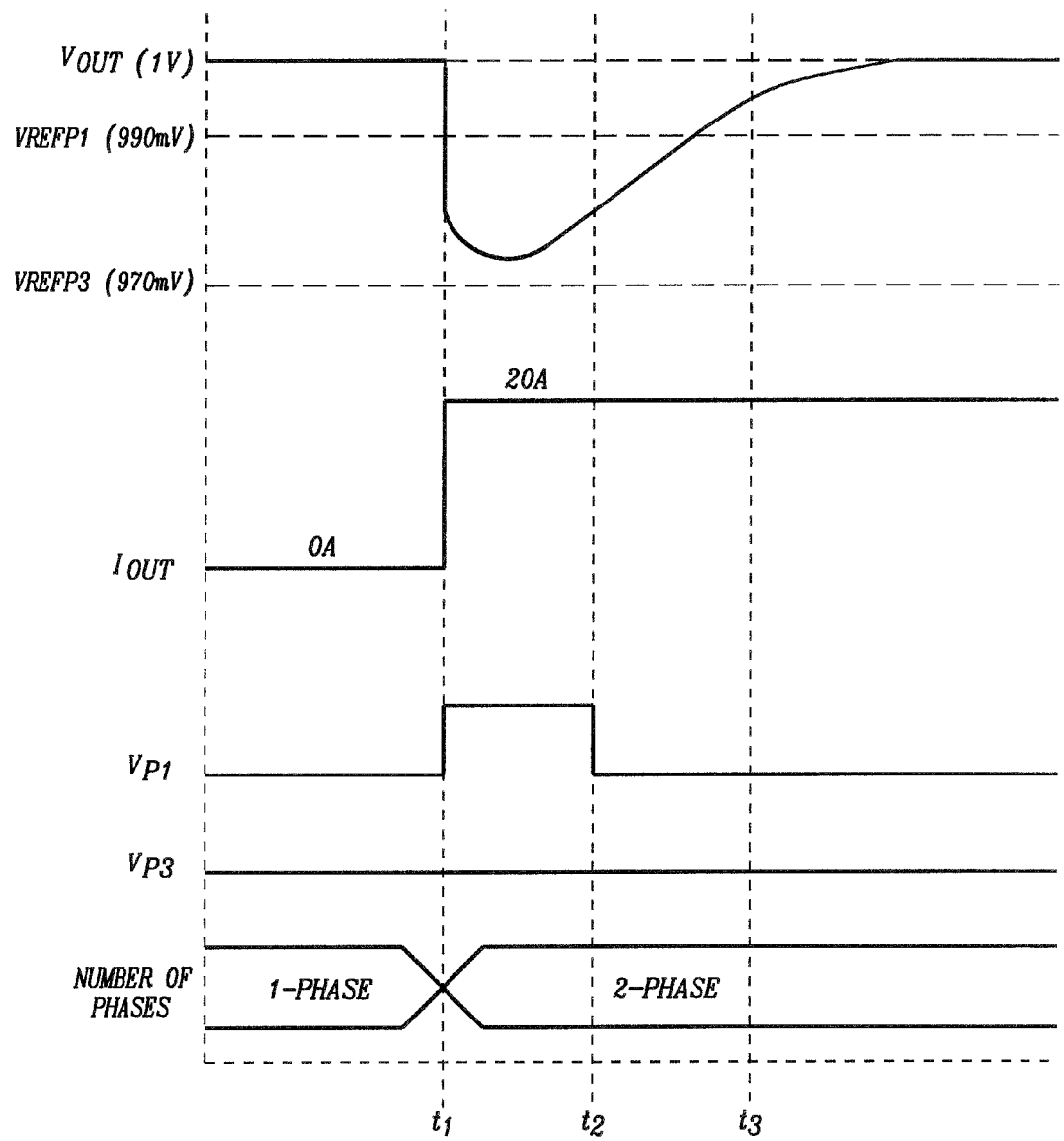

Referring now to FIGS. 3b, 7, and 8, in some embodiments, it is possible to maintain a fewer number of panic comparators 115a, 115b ..., 115n. Having fewer panic comparators 115a, 115b ..., 115n may be more practical as long as there is not a dramatic overshoot. For example, the multi-phase switched-mode power supply includes two panic comparators 115a and 115c. Two panic reference voltage sources 120a and 120n are connected to the two panic comparators 115a and 115c to provide the two panic reference voltages $V_{REFP1}$ and $V_{REFP3}$ generated by the two panic reference voltage sources 120a and 120c. The two panic reference voltages $V_{REFP1}$ and $V_{REFP3}$ are at voltage level increments of 20 mv between each other and the panic reference voltages $V_{REFP1}$ being 10 mv less than the reference voltage level $V_{REF}$ as generated by the reference voltage generator 10. In this instance the reference voltage level $V_{REF}$ is approximately 1.0V. Thus, the first panic comparator 115a has a reference voltage $V_{REFP1}$ of approximately 990 mV (−10 mV), the second panic comparator 115c has a reference voltages $V_{REFP3}$ of approximately 970 mV (−30 mV). For this example the full load required four power stages 25a, 25b, 25c, and 25d operation is 40 A or 10 A for each of the power stages 25a, 25b, 25c, and 25d.

Referring now to FIG. 7, prior to the time $t_1$, the output current $I_{OUT}$ flowing through the load is approximately zero amps (0 A). The output voltage $V_{OUT}$ is to be maintained at the reference voltage level $V_{REF}$ as generated by the reference voltage generator 10. The output voltage $V_{OUT}$ and the output load current $I_{OUT}$ is maintained by the master power stage 25a and the slave power stages 25b, 25c and 25d have been deactivated. The output panic signals $V_{P1}$ and $V_{P3}$ of the two panic comparators 115a and 115c are to a deactivated logic level (0) with the master power stage 25a being the single stage activated.

At the time $t_1$, the load circuit is activated such that the output current $I_{OUT}$ increases to a higher load current level of approximately 30 A, again, precipitously. The master power stage 25a is not able to respond with sufficient current. Thus the output current $I_{OUT}$ is drawn from the load capacitor $C_L$. Thus causing the output voltage $V_{OUT}$ to decrease practically instantaneously until it reaches a level less than the first panic reference voltage level $V_{REFP1}$. The first panic comparator 115a is activated and the panic signal $V_{P1}$ transits from the deactivated level (0) to the activated level (1). The slave power stage 25b is activated such that now the master power stage 25a and the slave power stage 25b begin to increase the current capacity to slow the decrease in the output voltage $V_{OUT}$. At the time $t_2$, the output voltage $V_{OUT}$ decreases until it reaches a level less than the second panic reference voltage level $V_{REFP3}$. The second panic comparator 115c is activated and the panic signal $V_{P3}$ transits from the deactivated level (0) to the activated level (1). The slave power stages 25b, 25c, and 25d are activated such that now master power stage 25a and the slave power stages 25b, 25c and 25d begin to increase the current capacity such that the output voltage $V_{OUT}$ rises toward the reference voltage level $V_{REF}$ of approximately 1.0V. At the time $t_3$, the second panic comparator 115c deactivates and the panic signal $V_{P3}$ transits from the activated level (1) to the deactivated level (0). At the time $t_4$, the first panic comparator 115a deactivates and the panic signal $V_{P1}$ transits from the activated level (1) to the deactivated level (0). At the time $t_5$, the capacity of the slave power stages 25b, 25c and 25d has not increased sufficiently and the output voltage $V_{OUT}$ overshoots slightly until the time $t_6$. At the time $t_6$, the master power stage 25a and the three slave power stages 25b, 25c and 25d are now regulating the output voltage $V_{OUT}$. Once the panic signals $V_{P1}$ and $V_{P3}$ are activated at the time $t_2$, the power stages 25a, 25b, 25c, and 25d are activated and the full four phase control of the power stages 25a, 25b, 25c, and 25d continues regardless of the state of the panic signals $V_{P1}$ and $V_{P3}$.

Referring now to FIG. 8, prior to the time $t_1$, the output current $I_{OUT}$ flowing through the load is approximately zero amps (0 A). The output voltage $V_{OUT}$ is to be maintained at the reference voltage level $V_{REF}$ as generated by the reference voltage generator 10. The output voltage $V_{OUT}$ and the output current $I_{OUT}$ is maintained by the master power stage 25a and the slave power stages 25b, 25c, and 25d have been deactivated. The output panic signals $V_{P1}$ and $V_{P3}$ of the two panic comparators 115a and 115c are to a deactivated logic level (0) with the master power stage 25a being the single stage activated.

At the time $t_1$, the load circuit is actuated such that the output load current $I_{OUT}$ increases to a higher load current level of approximately 30 A, again, precipitously. The master power stage 25a is not able to respond with sufficient current. Thus the output current $I_{OUT}$ is drawn from the load capacitor $C_L$. This causes the output voltage $V_{OUT}$ to decrease practically instantaneously until it reaches a level less than the first panic reference voltage level $V_{REFP1}$. The first panic comparator 115a is activated and the panic signal $V_{P1}$ transits from the deactivated level (0) to the activated level (1). The slave power stage 25b is activated such that now the master power stage 25a and the slave power stage 25b begin to increase the current capacity such that the output voltage $V_{OUT}$ rises toward the reference voltage level $V_{REF}$ of approximately 1.0V. With the activation of the slave power stage 25b, the output voltage $V_{OUT}$ does not decrease until it reaches a level less than the second panic reference voltage level $V_{REFP3}$. Consequently, only the master power stage 25a and the slave power stage 25b remain activated to provide the necessary output current $I_{OUT}$ to the load 35.

At the time $t_2$, the second panic comparator 115a deactivates and the panic signal $V_{P1}$ transits from the activated level (1) to the deactivated level (0). The deactivation of the panic signal $V_{P1}$ has no impact on the functioning of the power stages 25a, 25b, 25c, and 25d and they continue to function regardless of the state of the panic signals $V_{P1}$ and $V_{P3}$. At the time $t_3$, the two power stages 25a, 25b are now regulating the output voltage $V_{OUT}$.

Figure 9A:
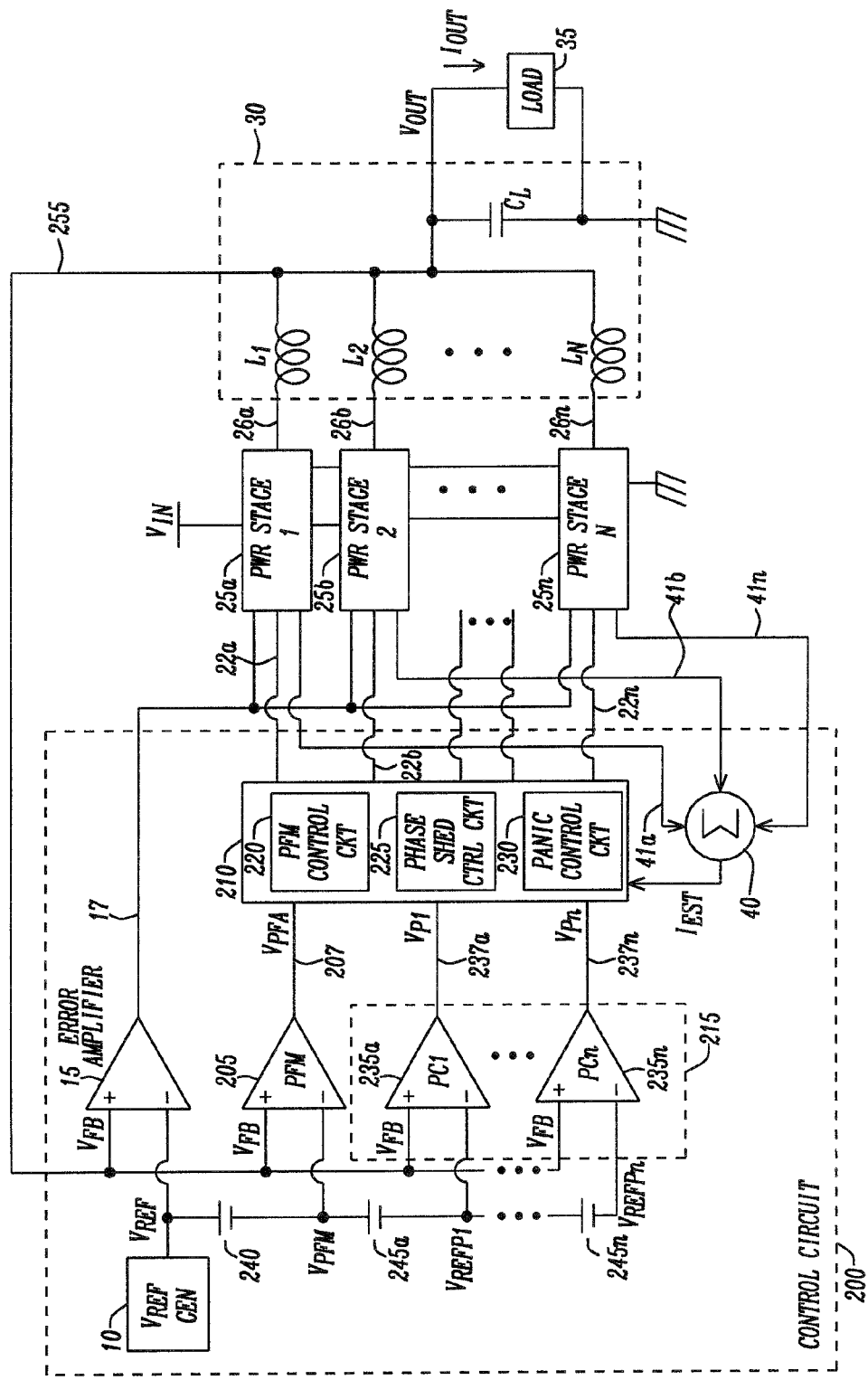
FIG. 9a is a schematic of a multi-phase switched-mode power supply incorporating a panic comparator embodying the principle of the present disclosure.

FIG. 9a is a schematic of a multi-phase switched-mode power supply incorporating a panic comparator 205 embodying the principles of the present disclosure. The switched-mode converter of FIG. 9a is structured as a multiphase buck switched-mode converter. The multiphase buck switched-mode converter has a control circuit 200, multiple power stages 25a, 25b, 25c, . . . , 25n, and a filter stage 30. The multiple power stages 25a, 25b, 25c, . . . , 25n, and a filter stage 30 are structured and function as described in FIG. 1.

The commonly connected second terminals of the inductors $L_1, L_2, \ldots, L_n$ and the first plate of the load capacitor $C_L$ are connected to an input of the control circuit 100 to provide a feedback path 255 for comparing the output voltage $V_{OUT}$ of the multiphase buck switched-mode converter with a reference voltage level $V_{REF}$. The reference voltage generator 10 generates the reference voltage level $V_{REF}$.

The control circuit 200 has an error amplifier 15 that receives the feedback voltage $V_{FB}$ that is returned from output voltage $V_{OUT}$ and the reference voltage level $V_{REF}$ from reference voltage generator 10. The output of the error amplifier 15 is an error voltage 17 that is applied to each of the power stages 25a, 25b, 25c, . . . , 25n.

The current sense signals 41a, . . . , 41n from each of the power stages 25a, 25b, . . . , 25n are inputs to the total current estimation circuit 40. The total current estimation circuit 40 is a summation circuit that totals the current sense signals 41a, . . . , 41n to determine the estimated total current signal $I_{EST}$. The estimated total current signal $I_{EST}$ is applied to the phase control circuit 210 and thus to the phase shedding control circuit 225. As the estimated total current signal $I_{EST}$ varies, the phase control circuit 225 generates the phase shedding signals 22a, 22b, . . . , 22n for activating and deactivating selected power stages 25a, 25b, . . . , 25n for maintaining the efficiency of the operation of the multi-phase switched-mode power supply.

The control circuit 200 has a pulse frequency modulator (PFM) circuit 205 that compares the fed-back output voltage $V_{FB}$ to pulse frequency reference voltages $V_{PFM}$. The pulse frequency reference voltage source 240 generates the pulse frequency modulation reference voltage $V_{PFM}$ that is at an incremental voltage level less than the reference voltage level $V_{REF}$ as generated by the reference voltage generator 10. The output 207 of the pulse frequency modulator circuit 205 transfers the pulse frequency activation signal $V_{PFA}$ to the phase control circuit 210 and thus to the pulse frequency modulation control circuit 220. The phase control circuit 210 generates the timing signals for activating the master power stage 25a to turn on the PMOS transistor $M_P$ of the master power stage 25a for a brief period of time to maintain the output voltage $V_{OUT}$ in the discontinuous conduction mode of operation.

The control circuit 200 has a panic comparator circuit 215 that compares the fed-back output voltage $V_{FB}$ to multiple panic reference voltages $V_{REFP1}, V_{REFP2}, \ldots, V_{REFPn}$. The panic reference voltage sources 245a, 245b, ..., 245n generate the multiple panic reference voltages $V_{REFP1}, V_{REFP2}, \ldots, V_{REFPn}$ that are at incremental voltage levels less than the reference voltage level $V_{REF}$ as generated by the reference voltage generator 10 and the pulse frequency modulation reference voltage $V_{PFM}$. The panic comparator circuit 215 has multiple panic comparators 235a, ..., 235n. Each of the multiple panic comparators 235a, ..., 235n are connected to one of the incremental multiple panic reference voltages $V_{REFP1}, \ldots, V_{REFPn}$. The result of the comparison of the fed-back output voltage $V_{FB}$ and the incremental multiple panic reference voltages $V_{REFP1}, \ldots, V_{REFPn}$ are the multiple panic signals $V_{P1}, \ldots, V_{Pn}$ that are the outputs 237a, ..., 237n of the multiple panic comparators 235a, ..., 235n. The multiple panic signals $V_{P1}, \ldots, V_{Pn}$ are inputs to the phase control circuit 210 and is then transferred to the panic controller circuit 230 for activating all deactivated power stages 25a, 25b, ..., 25n as required to dynamically respond to transient changes in load current $I_{LOAD}$ for minimizing undershoot while avoiding overshoot of an output voltage $V_{OUT}$ of the multi-phase switched-mode converter.

The structure of the control 200 is shown with any number of multiple panic comparators 235a, ..., 235n and any number of multiple panic reference voltages $V_{REFP1}, \ldots, V_{REFPn}$. Similarly, the multi-phase switched-mode power supply may have any number of power stages 25a, 25b, 25c, ..., 25n and the filter stage 30 may have any number of inductors $L_1, L_2, \ldots, L_n$, where each of the inductors $L_1, L_2, \ldots, L_n$ is connected to one of the power stages 25a, 25b, 25c, ..., 25n. The phase control circuit 210 is structured such that the panic control circuit 230 assumes control of the power stages 25a, 25b, 25c, ..., 25n when the first panic comparator 235a is activated and forces the multi-phase switched-mode power supply into a continuous conduction mode from the discontinuous conduction mode when the multi-phase switched-mode power supply is operating under the phase frequency control circuit 220. The panic control circuit 230 determines which of the power stages 25a, 25b, 25c, ..., 25n are activated base on which of the multiple panic comparators 235a, ..., 235n have their panic signals $V_{P1}, \ldots, V_{Pn}$ activated for minimizing undershoot and for preventing the overshoot of the voltage level of the output voltage $V_{OUT}$, when the large transient becomes larger than any or all of the panic reference voltage levels $V_{REFP1}, \ldots, V_{REFPn}$.

Figure 9B:
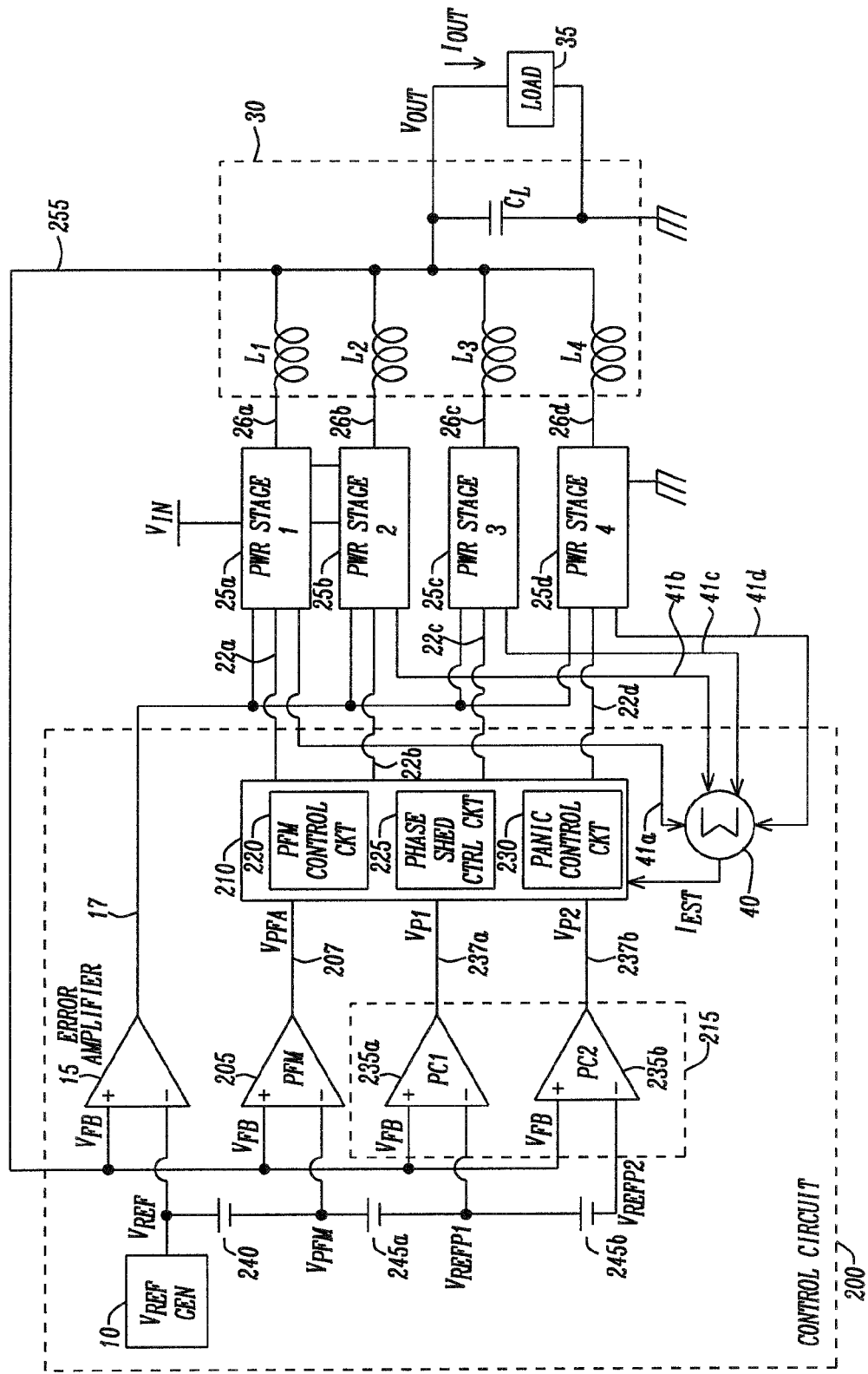
FIG. 9b is a schematic of a multi-phase switched-mode power supply incorporating a pulse frequency modulator circuit and two panic comparators of 9a with four power stages embodying the principle of the present disclosure.
Figure 10:
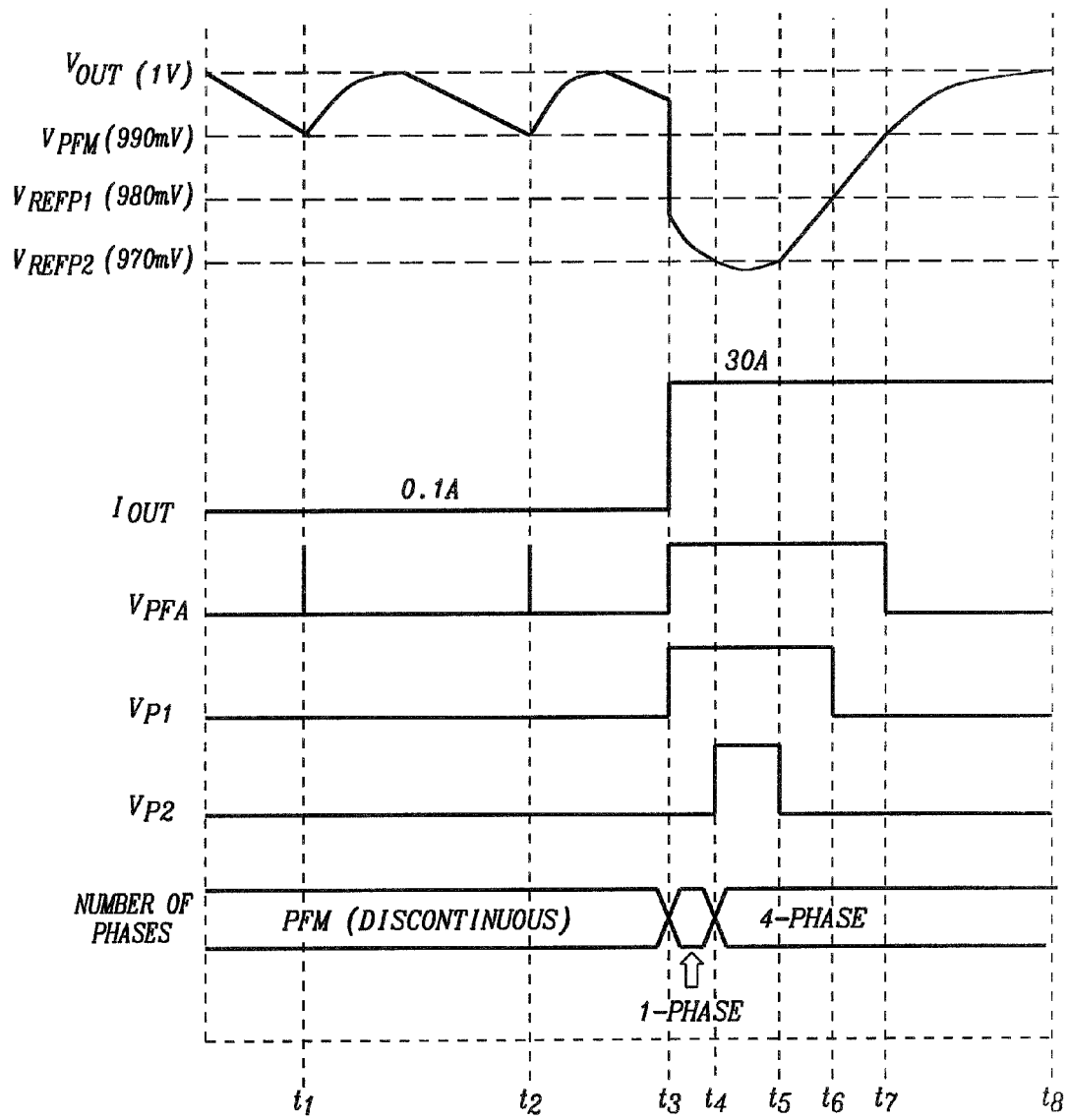
FIG. 10 is a plot illustrating the voltage and current waveforms within the multi-phase switched-mode power supply of FIG. 9.

FIG. 9b is a schematic of a multi-phase switched-mode power supply incorporating a pulse frequency modulator circuit 205 and two panic comparators 235a and 235b of 9a with four power stages 25a, 25b, 25c, and 25d embodying the principle of the present disclosure. FIG. 10 is a plot illustrating the voltage and current waveforms within the multi-phase switched-mode power supply of FIG. 9b. In order to simplify the explanation of the operation of the multi-phase switched-mode power supply of FIG. 9a, the multi-phase switched-mode power supply has a total of four power stages 25a, 25b, 25c, and 25d. One power stage will be designated as the master stage 25a and the remaining three power stages 25b, 25c, and 25d will be designated as the slave power stages. The multi-phase switched-mode power supply includes the pulse frequency modulation comparator 205 and two panic comparators 235a and 235b. The pulse frequency modulation comparator 205 is connected as described above to compare the fed back voltage $V_{FB}$ that is provided from the connection 255 from the output of the multi-phase switched-mode power supply. Two panic reference voltage sources 245a and 245b are connected to the two panic comparators 235a and 235b to provide the two panic reference voltages $V_{REFP1}$ and $V_{REFP2}$. The two panic reference voltages $V_{REFP1}$ and $V_{REFP2}$ are at voltage level increments of 10 mv less than the pulse frequency modulation reference voltage $V_{PFM}$ that is at an incremental voltage level less than the reference voltage level $V_{REF}$ as generated by the reference voltage generator 10. Thus, the pulse frequency modulation comparator 205 has a pulse frequency reference voltage $V_{PFM}$ of approximately 990 mV (−10 mV), the first panic comparator 235a has a reference voltages $V_{REFP1}$ of approximately 980 mV (−20 mV), and the second panic comparator 235b has a reference voltages $V_{REFP2}$ of approximately 970 mV (−30 mV). For this example the full load required full four power stage 25a, 25b, 25c, ..., 25n operation is 30 A.

Referring now to FIGS. 9b and 10, prior to the time $t_1$, the output current $I_{OUT}$ flowing through the load is approximately 0.1 A. The output voltage $V_{OUT}$ is decaying from the reference voltage level $V_{REF}$. The output voltage $V_{OUT}$ and the output current $I_{OUT}$ is maintained by the master power stage 25a and the slave power stages 25b, 25c, and 25d have been deactivated. The output panic signals $V_{P1}$ and $V_{P2}$ of the two panic comparators 235a and 235b are to a deactivated logic level (0) with the master power stage 25a being the single stage activated periodically in a discontinuous conduction mode of operation.

At the time $t_1$, the output voltage $V_{OUT}$ has decayed to the level of the pulse frequency reference voltage $V_{PFM}$ and the pulse frequency modulation comparator 205 is activated to generate a single pulse of the pulse frequency activation signal $V_{PFA}$ to cause the master power stage 25a to turn on the on the PMOS transistor $M_P$ for a brief period of time to maintain the output voltage $V_{OUT}$ in the discontinuous conduction mode of operation. The output voltage $V_{OUT}$ rises to the reference voltage level $V_{REF}$. The PMOS transistor $M_P$ turns off and the output voltage $V_{OUT}$ decays to the level of the pulse frequency reference voltage $V_{PFM}$ at the time $t_2$. At the time $t_2$, the pulse frequency modulation comparator 205 is activated to generate a single pulse of the pulse frequency activation signal $V_{PFA}$ to cause the master power stage 25a to turn on the on the PMOS transistor $M_P$ for a brief period of time to maintain the output voltage $V_{OUT}$ in the discontinuous conduction mode of operation. The output voltage $V_{OUT}$ rises to the reference voltage level $V_{REF}$. The PMOS transistor $M_P$ turns off and the output voltage $V_{OUT}$ begins to decay until the time $t_3$.

At the time $t_3$, the output current $I_{OUT}$ increases precipitously from the 0.1 A level to the 30 A level. The master power stage 25a is not able to respond with sufficient current. Thus the output current $I_{OUT}$ is drawn from the load capacitor $C_L$. This causes the output voltage $V_{OUT}$ to decrease practically instantaneously until it reaches a level less than the pulse frequency reference voltage $V_{PFM}$ and the first panic reference voltage level $V_{REFP1}$. The first panic reference voltage level $V_{REFP1}$ is activated to override the operation of the pulse frequency activation signal $V_{PFA}$ and to turn on the master power stage 25a. At almost the time $t_3$ the first panic comparator 235a is activated and the panic signal $V_{P1}$ transits from the deactivated level (0) to the activated level (1). The first slave power stage 25b turns on its PMOS transistor $M_P$.

The master power stage 25a has increased the current capacity for the output current $I_{OUT}$ to cause output voltage $V_{OUT}$ to slow its decrease until the time $t_4$. The second panic comparator 235a is then activated and the panic signal $V_{P2}$ transits from the deactivated level (0) to the activated level (1). The slave power stages 25c, and 25d turn on their PMOS transistors $M_P$. The master power stage 25a and the slave power stages 25b, 25c, and 25d are all activated and begin to increase the current capacity such that the output voltage $V_{OUT}$ rises toward the reference voltage level $V_{REF}$ of approximately 1.0V. At the time $t_5$, the second panic comparator 235n deactivates and the panic signal $V_{P2}$ transits from the activated level (1) to the deactivated level (0). At the time $t_6$, the first panic comparator 235a deactivates and the panic signal $V_{P1}$ transits from the activated level (1) to the deactivated level (0). And at the time $t_7$, the pulse frequency modulation comparator 205 deactivates and the pulse frequency activation signal $V_{PFA}$ transits from the activated level (1) to the deactivated level (0). The deactivation of the panic signals $V_{P1}$ and $V_{P2}$ and the pulse frequency activation signal $V_{PFA}$ have no impact on the functioning of the power stages 25a, 25b, 25c, and 25d and they continue to function regardless of the state of the panic signals $V_{P1}$ and $V_{P2}$ and the pulse frequency activation signal $V_{PFA}$. At the time $T_8$, the four power stage 25a, 25b, 25c, and 25d are now regulating the output voltage $V_{OUT}$ at the voltage controlled by the reference voltage level $V_{REF}$.

While this disclosure has been particularly shown and described with reference to the preferred embodiments thereof, it will be understood by those skilled in the art that various changes in form and details may be made without departing from the spirit and scope of the disclosure.

What is claimed is:

1. A control circuit included within a multi-phase switched-mode converter and configured for adjusting operational signals for operating a master power stage and a plurality of slave power stages of the multi-phase switched-mode converter to dynamically respond to transient changes in load current, comprising:
    a plurality of panic comparators, each panic comparator having an input terminal connected to receive a feedback voltage indicative of an output voltage of the multi-phase switched-mode converter;
    a plurality of panic reference voltage sources, each panic reference voltage source is connected to a reference terminal of one panic comparator to provide a panic reference voltage to the one panic comparator, wherein each of the plurality of panic comparators is configured to compare the feedback voltage with an associated panic reference voltages to generate one panic indicator signal of a plurality of panic indicator signals at an output terminal of each of the panic comparators;
    a pulse frequency modulation comparator connected for receiving the feedback voltage and configured for generating a discontinuous control signal;
    a pulse frequency modulation reference voltage source providing a pulse frequency modulation reference voltage to the pulse frequency modulation comparator for comparison with the feedback voltage for determining if the feedback voltage is less than or greater than the pulse frequency modulation reference voltage; and
    a phase controller configured for activating and deactivating a master power stage and a plurality of slave power stages of the multi-phase switched-mode converter, the phase controller comprising:
        a pulse frequency modulation controller in communication with the pulse frequency modulation comparator for receiving the discontinuous control signal and in communication with at least one of the plurality of panic comparators for receiving at least one of the plurality of panic indicator signals and configured for providing conduction mode control signals to the master power stage for operating in a discontinuous conduction mode of operation, wherein when the feedback voltage is greater than a voltage level of the pulse frequency modulation reference voltage, the multi-phase switched-mode converter operates in the discontinuous mode of operation and wherein when the feedback voltage is less than at least one of the panic reference voltage levels, the multi-phase switched-mode converter operates in the continuous mode of operation;
        a panic controller connected to each of the output terminals of the plurality of panic comparators to receive the plurality of panic indicator signals from the plurality of panic comparators signifying that the feedback voltage is less than the panic reference voltage of a second of the plurality reference voltage sources, wherein the panic controller determines which of the slave power stages are to be activated to match the transient change to the load current.

2. The control circuit included within the multi-phase switched-mode converter of claim 1 wherein the reference voltages of the plurality of reference voltage sources are separated by increments of voltage such that the panic controller will activate at least one of the slave power stages.

3. The control circuit included within the multi-phase switched-mode converter of claim 1 wherein the multi-phase switched-mode converter comprises at least the master power stage and one slave power stage.

4. The control circuit included within the multi-phase switched-mode converter of claim 1 wherein each of the plurality of reference voltage sources are adjustable to vary the reference voltage levels dependent upon a transient response of each of the plurality of slave power stages.

5. The control circuit included within the multi-phase switched-mode converter of claim 1 wherein when a large transient change load current occurs, the panic controller activates the master power stage to operate in the continuous conduction mode and when the large transient becomes larger than the reference voltage levels of at least one of the plurality reference voltage levels, the panic controller activates at least one of the slave power stages.

6. A multi-phase switched-mode converter configured for selectively setting a master stage in a continuous conduction mode or discontinuous conduction mode and adding at least one of a plurality of slave power stages included within the multi-phase switched-mode converter to dynamically respond to transient changes in load current, the multi-phase switched-mode converter comprising:
- a control circuit configured for adjusting operational signals of a master power stage included within the multi-phase switched-mode converter and the plurality of slave power stages of the multi-phase switched-mode converter, the control circuit comprising:
    - a plurality of panic comparators, each panic comparator having an input terminal connected to receive a feedback voltage indicative of an output voltage of the multi-phase switched-mode converter,
    - a plurality of panic reference voltage sources, each panic reference voltage source is connected to a reference terminal of one panic comparator to provide a panic reference voltage to the one panic comparator, wherein each of the panic comparators is configured to compare the feedback voltage with an associated panic reference voltage to generate a one panic indicator signal of a plurality of panic indicator signals at an output terminal of each of the panic comparators,
    - a pulse frequency modulation comparator connected for receiving the feedback voltage and configured for generating a discontinuous control signal;
    - a pulse frequency modulation reference voltage source providing a pulse frequency modulation reference voltage to the pulse frequency modulation comparator for comparison with the feedback voltage for determining if the feedback voltage is less than or greater than the pulse frequency modulation reference voltage; and
    - a phase controller configured for activating and deactivating a master power stage and a plurality of slave power stages of the multi-phase switched-mode converter, the phase controller comprising:
        - a pulse frequency modulation controller in communication with the pulse frequency modulation comparator for receiving the discontinuous control signal and in communication with at least one of the plurality of panic comparators for receiving at least one of the plurality of panic indicator signals and configured for providing conduction mode control signals to the master power stage for operating in a discontinuous conduction mode of operation, wherein when the feedback voltage is greater than a voltage level of the pulse frequency modulation reference voltage, the multi-phase switched-mode converter operates in the discontinuous mode of operation and wherein when the feedback voltage is less than at least one of the panic reference voltage levels, the multi-phase switched-mode converter operates in the continuous mode of operation;
        - a panic controller connected to each of the output terminals of the plurality of panic comparators to receive the plurality of the panic indicator signals from the plurality of panic comparators signifying that the feedback voltage less than the panic reference voltage of a second of the plurality reference voltage sources, wherein the panic controller determines which of the slave power stages are to be activated to match the transient change to the load current.

7. The multi-phase switched-mode converter of claim 6 wherein the voltage level of the plurality of reference voltage sources are separated by increments of voltage such that the panic controller will activate at least one of the slave power stages.

8. The multi-phase switched-mode converter of claim 6 wherein the multi-phase switched-mode converter comprises at least the master power stage and one slave power stage.

9. The multi-phase switched-mode converter of claim 6 wherein each of the plurality of reference voltage sources are adjustable to vary the reference voltage levels dependent upon a transient response of each of the plurality of slave power stages.

10. The multi-phase switched-mode converter of claim 6 wherein when a large transient change load current occurs, the panic controller activates the master power stage to operate in the continuous conduction mode and when the large transient becomes larger than the reference voltage levels of at least one of the plurality reference voltage levels, the panic controller activates at least one of the slave power stages.

* * * * *